Nov. 30, 1937.　　　　G. WINTRITZ　　　　2,100,557
SEPARABLE FASTENER
Filed July 27, 1933
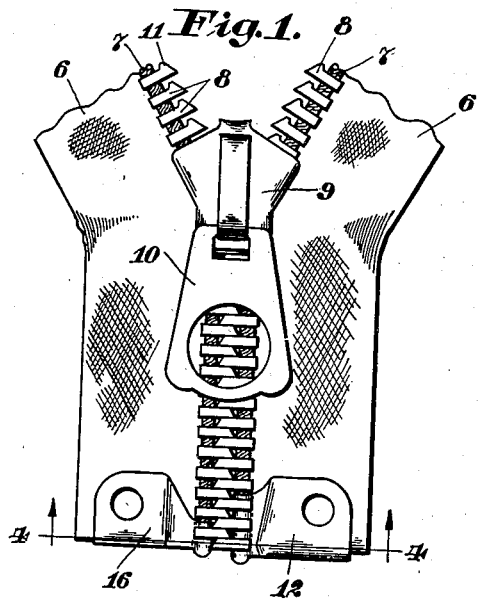
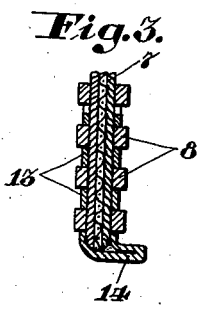
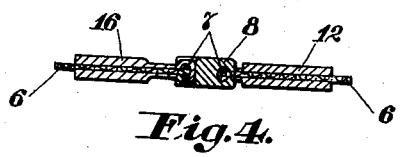
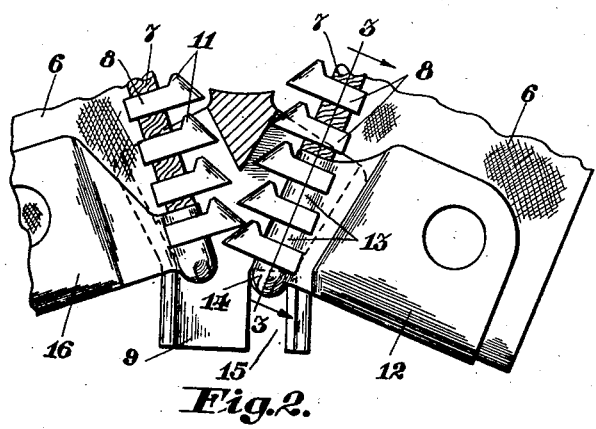
INVENTOR.
George Wintritz
BY Kelley + Chisholm
ATTORNEY.

Patented Nov. 30, 1937

2,100,557

UNITED STATES PATENT OFFICE 2,100,557

SEPARABLE FASTENER

George Wintritz, Springdale, Conn., assignor to Hookless Fastener Company, a corporation of Pennsylvania Application July 27, 1933, Serial No. 682,480

6 Claims. (Cl. 24—205)

My invention relates to separable interlocking fasteners and more particularly to means permitting complete separation of the opposite sides of such a fastener.

An object of my invention is to provide simple and effective device for holding together the initially connected or lower ends of separable interlocking fasteners, which will be at the same time capable of easy re-engagement.

Many end connecting devices have been proposed for the stringers of slide fasteners, in order that the two halves of the fastener may be completely separated. Such separation is required in coat-like garments and many other articles. Only a small percentage of the connecting devices which have been proposed have been in any way successful, and considerable difficulty and expense has been involved in their manufacture. Such known devices have consisted of separate parts, such as pins and sockets, which are attached to the flexible stringers below the rows of fastener elements and which are designed to bring the rows of fastener elements into proper relation for their initial engagement.

My invention avoids the use of extra connecting parts below the rows of fastening members, thus enhancing the appearance of the fastener and making it considerably simpler and cheaper to manufacture.

In order for the fastener to rip open from the bottom or initially closed end when the fastener is closed, the stringer must flex to a considerable degree. The degree of flexing required for opening the fastener from the lower end is considerably greater than required for opening from the other end. My invention takes advantage of this fact by stiffening one of the stringers at the lower end thus preventing flexibility between a plurality of the members on one stringer, and preferably allowing normal flexibility between members on the other stringer. In this manner the tendency of the fastener to rip open from the bottom end is avoided and at the same time, the other stringer may be assembled or disengaged therefrom in the usual manner.

In the accompanying drawing I have shown for purposes of illustration, one embodiment which my invention may assume in practice. In this drawing:

Fig. 1 is a general plan view of a fastener constructed according to my invention;

Fig. 2 is a similar view on an enlarged scale, showing the slider in position for initial engagement of the parts;

Fig. 3 is a cross-section on line 3—3 of Fig. 2; and

Fig. 4 is a cross-section on line 4—4 of Fig. 1.

The fastener used in illustrating my invention comprises a pair of flexible supports, herein fabric tapes 6, having flexible corded edges 7, and cooperating rows of fastener elements 8 attached to the corded edges. These fastener elements are arranged in uniformly spaced relation and the cord connection between them is flexible. The fastener members are brought together and progressively interlocked or disengaged by means of a slider 9, which may be actuated by a pull tab 10.

The fastener elements are of the type having projections 11 on one side and correspondingly shaped recesses not illustrated, on the other side. This corresponds to a well-known type of fastener on the market and its construction and operation is more fully disclosed in Sundback Patent 1,219,881.

With this type of fastener member, the elements are more easly ripped open beginning from the upper end, but it is also possible to rip them open from the lower end unless the stringers are connected in some manner. In the latter operation, however, considerably more flexibility between the fastener members is required in order to permit disengagement of the projections from the recesses of the opposed members.

Suitable means is employed for substantially rigidly connecting together a plurality of interlocking elements of one row at the initially connected end of the fastener in order to prevent any substantial relative movement between the connected members and so prevent disengagement of the initially connected end except by progressive disengagement of the interlocking elements from the other end. This may be accomplished by sufficiently stiffening the lower end of the corded portion of one of the stringers, but preferably the last three interlocking elements are positively connected together as illustrated in Fig. 2. In this embodiment this stiffening is accomplished by the metal plate 12 which is formed around the lower end of the stringer and which has cylindrical portions 13 between the fastener elements and which serve to stiffen the corded edge of the stringer at these points and positively hold the three interlocking elements to prevent any substantial relative movement between them. Preferably the metal stiffening member is designed to cover three of the interlocking members, although in some instances more or less may be preferred. The member 12 also acts as a reinforcement for the end of the tape. A portion of the member 12 is bent up to form a lateral projection 14 which engages in a slot 15 of the slider when the slider is moved to the lower end of the rows of fastener members, to form a stop and to position the slider accurately for the initial engagement of the parts. The lower end of the other stringer is reinforced by a sheet metal member 16 which corresponds to the member 12 except that it embraces only one of the fastening elements. With this arrangement the parts can not be separated by any normal pull at the lower end and at the same time, easy engagement and disengagement of the parts is permitted. Alternatively, the lower end of the stringer may be stiffened by solder, glue or the like; or the three fastener elements at the end may be formed in one solid piece.

In common practice the end of the fastener which has the reinforcement plates 12 and 16 is referred to as the lower end while the other end of the fastener is referred to as the upper end. This same terminology is used in the specification and claims of this application but it will be understood that the fastener can be inverted without changing the function of the parts.

While I have in this application specifically shown and described one embodiment which my invention may assume in practice, it will be understood that this embodiment is merely for the purposes of illustration and description and that various other forms may be devised within the scope of my invention as defined in the following claims.

What I claim as my invention is:

1. A separable interlocking fastener comprising a pair of flexible tapes, rows of fastener members secured in spaced relation along the edges of said tapes, said fastener members having cooperating recesses and projections for interlocking engagement, and means for preventing separation of the fastener members from the initially connected end while permitting separation by a tearing action from the other end, which comprises a sheet metal piece bent around one stringer and having portions filling the spaces between at least three fastener members at the end whereby said fastener members are rigidly supported against flexing relative to one another whereby said fastener members themselves may prevent unintentional separation while the fastener is closed.

2. In a completely separable interlocking fastener of the type having cooperating stringers adapted to be initially connected at one end and progressively connected by a slider to the other end, the combination of a row of flexibly connected interlocking elements on each stringer, the interlocking elements in each row having means for interlocking with the elements of the other row when the elements are progressively inter-engaged from the initially connected end of the stringer and means for preventing separation of the interlocking elements at the initially connected end except by progressive disengagement from the other end, comprising means for preventing substantial relative movement between a plurality of interlocking elements at the initially connected end of one row.

3. A fastener as defined in claim 2 having means providing a slider stop at the initially closed end of one of the rows of interlocking elements.

4. In a completely separable interlocking fastener of the type having cooperating stringers adapted to be initially connected at one end and progressively connected by a slider to the other end, the combination of a row of flexibly connected interlocking elements on each stringer, the interlocking elements in each row having means for interlocking with the elements of the other row when the elements are progressively inter-engaged from the initially connected end of the stringer and means for preventing separation of the interlocking elements at the initially connected end except by progressive disengagement from the other end, comprising a metal member rigidly connected to a plurality of interlocking elements at the initially connected end of one row.

5. In a completely separable interlocking fastener of the type having cooperating stringers adapted to be initially connected at one end and progressively connected by a slider to the other end, comprising in combination fabric tapes, cooperating rows of fastener elements uniformly spaced along the edges of the tapes and means connected to one of the tapes at the initially connected end for preventing relative movement between the last three of the fastener elements at the initially connected end.

6. In a completely separable interlocking fastener of the class described, having cooperating stringers adapted to be initially connected at one end and to be progressively connected by movement of a slider to the other end, comprising a pair of fabric tapes, and fastener elements attached to the edges of the tapes in uniformly spaced relation, and sheet metal stiffening and reinforcing members attached to the initial connecting end of each stringer, one of said members having a portion surrounding the edge of the tape with recesses in said portion to accommodate the fastener elements, said recesses being of substantially the same size as said fastener elements whereby the portions of said reinforcing member between said fastener elements serve to prevent relative movement between the fastener elements, the reinforcing member on the other side enclosing and rigidly supporting at least one of the fastener elements.

GEORGE WINTRITZ.